July 29, 1969

J. M. BENTLEY ET AL 3,458,728

GATING CIRCUIT EMPLOYING COMPARING MEANS
UTILIZING NEGATIVE RESISTANCE DEVICE

Original Filed March 13, 1964

INVENTOR
John M. Bentley and
Walter J. Lytle
BY
ATTORNEY

United States Patent Office 3,458,728
Patented July 29, 1969

3,458,728
GATING CIRCUIT EMPLOYING COMPARING
MEANS UTILIZING NEGATIVE RESISTANCE
DEVICE
John M. Bentley, Glen Burnie, and Walter J. Lytle,
Catonsville, Md., assignors to Westinghouse Electric Corporation, Pittsburgh, Pa., a corporation of
Pennsylvania
Continuation of application Ser. No. 351,696, Mar. 13,
1964. This application Aug. 7, 1967, Ser. No. 658,950
Int. Cl. H03k 17/58, 5/20, 3/30
U.S. Cl. 307—258
2 Claims

ABSTRACT OF THE DISCLOSURE

A voltage comparator for comparing a plurality of signal voltages is adapted for gating on or off the supply of clock pulses from a clock pulse generator to a controlled utilization device, such as a counter, is described. A transformer, whose primary constitutes an auxiliary load between the generator and the counter, has its impedance changed sharply in response to the voltage comparison. The secondary of the transformer is connected into a series circuit including a tunnel diode and a backward diode connected in oppositely-poled relation so that the easy flow direction is in the same direction through the circuit. A center tap terminal on the secondary and a terminal between the diodes constitute the terminals of a bridge circuit, two arms of which include the two diodes, respectively. The unknown and a reference voltage are connected in series between the two terminals and their algebraic sum is balanced against the secondary voltage. A pulse from the secondary in the easy flow direction of the tunnel diode namely, from the anode to the cathode, reflects low impedance into the primary and the clock pulses are gated off. When the unknown is greater than the reference voltage the tunnel diode will fire, effectively, opening the secondary circuit and reflecting high impedance into the primary.

---

This application is a continuation of our application, Ser. No. 351,696, filed Mar. 13, 1964, now abandoned in favor of this application.

This invention relates to improvements in a voltage comparator particularly adapted to be utilized in an analog to digital converter system.

A primary object of the present invention is to provide a novel and improved voltage comparator circuit.

The speed and accuracy of analog to digital systems varies over a wide range because in some instances speed and accuracy can be sacrificed in the interest of reducing costs. In other instances, it is essential that the system be capable of very high speed, that is, be capable of accepting and processing samples of input at a very high rate and with a very great accuracy. The present invention is directed to a simple, novel and inexpensive signal comparator circuit which is particularly adapted to operate with a so-called single level logic digitizer, the two components comprising an analog to digital system.

The accuracy of any such system is directly dependent upon the speed and accuracy with which the unknown can be sampled and the error signals in the form of pulses can be steered through the digitizer portion of the system. The sensitivity is dependent upon the speed and accuracy with which the system can follow the rapid excursions of the input analog signals and also upon the minimum size of increments of the analog signals which can be distinguished from one another.

In a copending application, Ser. No. 368,485, for Analogue to Digital Converter System, filed May 19, 1964, in the name of Charles P. Holt, Jr. and assigned to the assignee of this application an analog to digital system is described and claimed in which the voltage comparator illustrated is the same as the one of this application. Accordingly, reference may be made to that application for further details concerning the environmental background in which the present invention may be used. In that system the digitizer is designed to count in one direction only in response to an error signal and to count backward in the absence of an error signal. In other words, in that system the digitizer responds to signals of one polarity. Accordingly, another object of the present invention is to provide a comparator circuit which generates pulses when there is a voltage inequality and generates no pulses when there is a voltage equality.

The invention itself however, both as to its organization and method of operation, as well as additional objects and advantages will best be understood from the following description when read in connection with the accompanying drawing, in which.

Broadly speaking, the present invention provides a comparator circuit including a tunnel diode and a "backward" diode connected in back-to-back series relation and wherein a reference voltage $E_R$ and a voltage to be sampled, $E_X$, are added to a unidirectional pulse signal supplied by a clock pulse generator, the amplitude of the pulse voltage applied in the forward direction to the tunnel diode being just below the breakover point of the tunnel diode. This pulse voltage negatively biases the "backward" diode, that is, applies a voltage to the "backward" diode opposite to its low impedance direction. When $E_X > E_R$ the bias on the tunnel diode, plus the unidirectional voltage, exceeds the breakover point an output pulse occurs, representing the difference between $E_R$ and $E_X$. The comparator puts out a voltage pulse only when the unknown voltage $E_X$ exceeds the reference voltage $E_R$ by one least bit. In the illustrated embodiment of the invention a tunnel diode and a "backward" diode are connected in a series circuit including the secondary of a transformer, the primary of which is adapted to be energized by the usual clock pulse generator. As will be clearer from the subsequent description, the tunnel diode and the "backward" diode are connected in back-to-back relation in that the like electrodes, in this case the anodes, are connected together so that the easy-flow-direction through the series circuit is in the same direction. The voltage comparison takes place across the tunnel diode and it is the tunnel diode which is fired when the unidirectional pulse voltage plus the difference bias voltage exceeds the breakover point of the tunnel diode. As will be clear from the subsequent description, the comparator generates output pulses only when $E_X$ is greater than $E_R$, in other words, when there is inequality and generates no pulses when there is an equality of voltages as between $E_R$ and $E_X$ or, when $E_X$ is less than $E_R$. Because of the fact that the tunnel diode has a rather steep differential negative resistive region, beginning at the breakover point, a very high signal is generated at the instant that the unknown voltage exceeds the reference voltage $E_R$. For example, with a selected tunnel diode having a peak current of 100 microamperes at 1 microvolt, a sensitivity of .5 microampere is obtainable. This is a factor which contributes to the greatly increased sensitivity of the present comparator.

Figure 1:
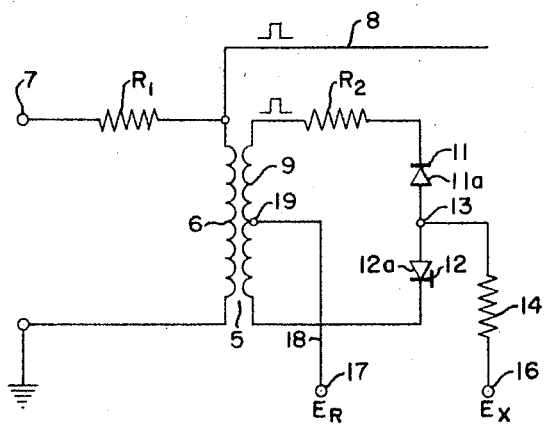
FIGURE 1 is a circuit diagram of an embodiment of the present invention.

Referring to FIG. 1 of the drawing, an illustrative embodiment of the present invention comprises a transformer 5; a primary winding 6 adapted to be energized by a clock pulse generator (not shown) to input terminal 7 and a resistor $R_1$. As will be apparent from the subsequent description the output pulse from the comparator, which may be a digitizer of the type described in the aforementioned patent application, or any other comparable system, is supplied over lead 8. When the primary winding 6 is continuously supplied with clock pulses, output pulses will not appear on lead 8 when the input voltage $E_X$ is less than the reference voltage $E_R$ because of the normally low reflected impedance drop across the primary winding 6. In an analog to digital conversion system this reference voltage would be generated in a conventional electrical summation ladder network. The terminals of the secondary winding 9 of the transformer 5 are connected in a series circuit including a "backward" diode 11, a tunnel diode 12 and a resistor $R_2$.

As seen from the drawing the anode 11a of the "backward" diode and the anode 12a of the tunnel diode are connected to a common terminal 13 on which the unknown voltage $E_X$ is impressed through the resistor 14 and the terminal 16. The reference voltage $E_R$ is impressed through the terminal 17 and the lead 18 to the center tap 19 of the secondary 9. Under the conditions when the voltage $E_X$ on the resistor 14 is greater by one least bit than $E_R$, on lead 18, and terminal 17 the secondary 9 of the transformer will be suddenly open-circuited due to the characteristics of the tunnel diode 12 and the "backward" diode 11, thus reflecting an increased impedance into the primary winding 6 causing the output pulse to be supplied over the connection 8. The reason for this operation will be apparent from reference to the characteristic curves for the "backward" diode 11 and the tunnel diode 12 illustrated in FIGS. 2 and 3, respectively. The "backward" diode was described in the proceedings of IRE in 1960. The tunnel diode is described in patent to Esaki 3,033,714, issued May 8, 1962, but it was first described in the prior art publications in 1958.

Figure 3:
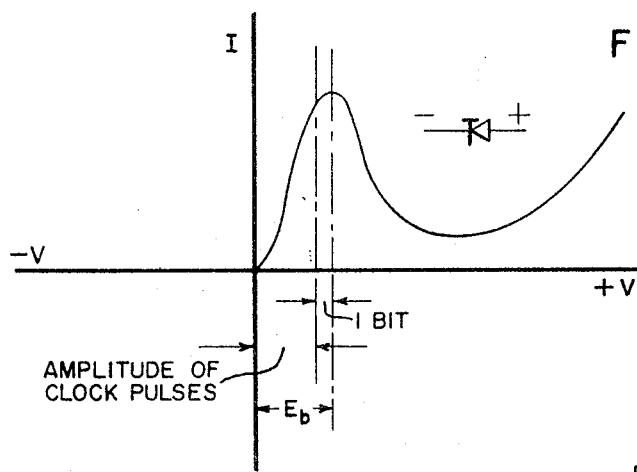
FIG. 3 is a graph showing the characteristic I–V curve for a tunnel diode.

It will be noted that when $E_X$ is greater than $E_R$ the anode of the tunnel diode 12 is slightly positive and from FIG. 3 it will be seen that a positive voltage loop from the transformer 9 adds to the voltage at the terminal 13 raising the voltage applied to the tunnel diode above the breakover voltage $E_b$ causing the tunnel diode to fire.

Figure 2:
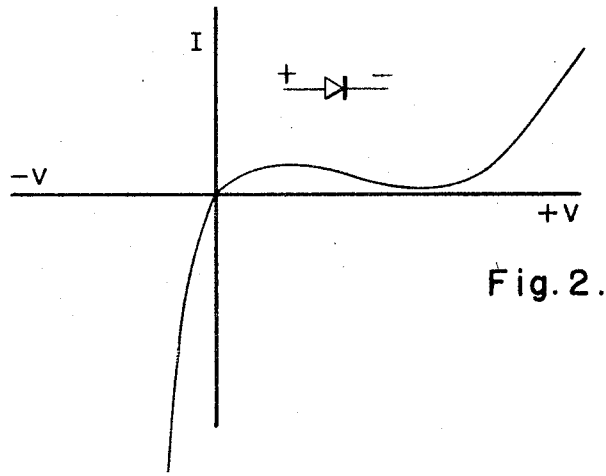
FIG. 2 is a graph showing the characteristic I–V curve for a "backward" diode.

Referring to FIG. 2, it will be seen that the easy-flow direction of the "backward" diode 11, although opposite to that of the tunnel diodes as regards its electrodes, is in the same direction in the series circuit thereby causing the secondary 9 to be substantially open circuited except for the resistance $R_2$ which is merely a loading resistor to cause the tunnel diode to operate in its bistable mode. This sudden change to high impedance in the secondary circuit is reflected into the primary 6, substantially increasing the impedance in the primary circuit and causing the output pulse as supplied to the lead 8. Under this condition it will be noted that the "backward" diode 11 is back biased, and referring to FIG. 2, it will be apparent that under this condition the current through the "backward" diode increases very fast with increase of voltage. The greater the impedance change of the back biased diode 11, that is, the greater its slope in the back bias region, the more sensitive will be the comparator since most of the DC imbalance between the center tap 19 on the secondary 9 and the terminal 13 is utilized to switch the tunnel diode 12.

Although not shown it will be obvious to one skilled in the art that there will be a substantially constant impedance between the terminals 16 and 17 when this device is incorporated into an analog to digital converter system. Conventionally, an electrical summation resistor ladder network such as that used in connection with a digitizer for developing a ramp function voltage would be connected between the terminals 16 and 17.

Under conditions where $E_X = E_R = O$, as a positive-going pulse is supplied to the terminal 7 by the clock generator (not shown), the pulse induces a voltage in the secondary winding 9 so that the upper end of the secondary is positive with respect to the opposite end of the secondary. This is the condition for easy flow through both of the diodes 11 and 12 and the value of the resistor $R_2$ is so chosen that, effectively, short circuit conditions exist in the secondary winding 9 for this polarity. This low impedance condition in the secondary winding is reflected into the primary winding 6 and therefore no pulse is delivered over the connection 8. Here it should be pointed out that in ordinary practice a suitable isolating buffer amplifier and clipping circuit (not shown) would preferably be incorporated between the connection 8 and the digitizer of an analog to digital converter system. The purpose of such a buffer amplifier or clipping circuit would be to clip off any small increase in the potential at the lead 8, not resulting from clock pulses as noise and thus make them ineffective.

Now assume that $E_X$ is greater than $E_R$, that is, the terminal 13 is more positive than the center tap 19 of the secondary winding 9, so that, as illustrated in FIG. 3, a single pulse representing one bit of information will cause the tunnel diode 12 to fire. Under most conditions the present invention would be incorporated into a system wherein the clock pulses would be continuously supplied to the primary winding 6. The effect of the firing of the tunnel diode 12, in conjoint response to the clock pulses and the error signals, is to open the series circuit to the secondary 9, or at least, increase its impedance very greatly. This greatly increased impedance is reflected into the primary winding 6 and the increased impedance drop across the latter winding causes a signal pulse to be generated across the resistance $R_1$ which is supplied over the lead 8 as previously mentioned. As previously mentioned this comparator is adapted to be used with a digitizer which tends to count only in one direction in the absence of a signal from the comparator and to count in the opposite direction in response to signals.

A salient feature of the present invention is its increased sensitivity primarily due to the use of the "backward" diode in the circuit configuration with the tunnel diode. When $E_X > E_R$ a direct current path from point 13 to point 19 is established. However, current flow from point 13 to point 19 through diode 11 is inhibited because a positive voltage applied to the anode 11a forward biases the diode 11, which for this "backward" diode is its high impedance or blocking direction. Accordingly, most of the current due to the voltage $E_X - E_R$ is directed through the sensitive tunnel diode 12.

Although the "backward" diode 11 inhibits flow of electric current from its anode to its cathode it enables current flow in the opposite direction resulting from the unidirectional clock pulses thus maintaining a low impedance on the secondary 9 prior to the firing of the tunnel diode 12.

Summarizing then, to the unidirectional clock pulse voltage across the secondary 9, the diodes 11 and 12 and the resistance $R_2$ present a low impedance current path. To direct current, when point 13 is positive with respect to point 19, the path through diode 12 is much easier than that through diode 11 and this causes the major portion of the voltage difference $E_X - E_R$ to be utilized in firing the tunnel diode 12. In practice, a sensitivity of .2 microampere at 1 mv. has been realized. This comparator is fast because the switching time for tunnel diodes can be much less than 1 microsecond.

From the foregoing it will be readily apparent that the present invention provides a novel and useful comparator circuit adapted to be used with a single level logic digitizer in analog to digital systems. It will be readily apparent that this comparator circuit is not confined to a so-called single level logic digitizer of the system mentioned but may be used anywhere else where this type of comparator circuit might be utilized.

It will be readily obvious that the present invention is not limited to exact details of the embodiments used for illustrative purposes. Those skilled in the art can make obvious changes without departing from the spirit of invention.

We claim as our invention:

1. A gating circuit, which has the capability of functioning as a comparator for comparing an unknown voltage with a known reference voltage, comprising, a primary of a transformer having a secondary, a source of unidirectional voltage pulses connected across said primary, and an output terminal directly connected to the primary, a diode having a non-linear characteristic with a positive differential resistance region and a negative differential resistance region separated by a peak current breakover point, said secondary being connected in a series circuit including said diode and means for impressing across said diode a voltage proportional to the algebraic sum of a reference voltage and an unknown voltage, whereby when said diode is fired as a result of the voltage induced in said secondary by a unidirectional voltage pulse in combination with said algebraic sum voltage the impedance of said primary will be modified to provide gating action and thus produce an output across said primary.

2. A gating circuit having the capability of functioning as a comparator for comparing an unknown input voltage with a known reference voltage comprising, a primary of a transformer having a secondary, a source of unidirectional voltage pulses connected across said primary, and an output terminal directly connected to said primary, a first diode having a non-linear I–V characteristic with a positive impedance and a negative differential impedance region separated by a peak current breakover point, a second diode having a higher differential forward impedance characteristic extending over substantially the same range of voltage as the positive and negative regions of the characteristics of said first diode, each of said diodes having similar low impedance reverse current characteristics, said secondary having a pair of outer terminals connected in a series circuit including said diodes connected in oppositely-poled relation, said secondary also having an intermediate third terminal, a fourth terminal electrically intermediate said diodes, means for impressing a reference voltage between either of said third or fourth terminals and a common circuit point and means for impressing an unknown reference voltage betwen the other of said third or fourth terminals and said common circuit point, said diodes being responsive to a resultant voltage of a selected polarity in combination with a unidirectional voltage pulse to modify the impedance between said pair of outer terminals of said secondary and across said primary and thus produce an output across said primary.

References Cited

UNITED STATES PATENTS 3,194,982   7/1965   Bentley.

ARTHUR GAUSS, Primary Examiner

JOHN ZAZWORSKY, Assistant Examiner

U.S. Cl. X.R.

307—323; 235